H. P. SMITH.
PACKING MACHINE FOR HAIRPINS.
APPLICATION FILED DEC. 26, 1918.

1,378,626.

Patented May 17, 1921.
7 SHEETS—SHEET 1.

WITNESS
J. F. Britt

INVENTOR
Homer P. Smith
BY
ATTORNEY

H. P. SMITH.
PACKING MACHINE FOR HAIRPINS.
APPLICATION FILED DEC. 26, 1918.

1,378,626.

Patented May 17, 1921.
7 SHEETS—SHEET 2.

WITNESS
T. P. Britt

INVENTOR
Homer P. Smith
BY
Young & Young
ATTORNEY

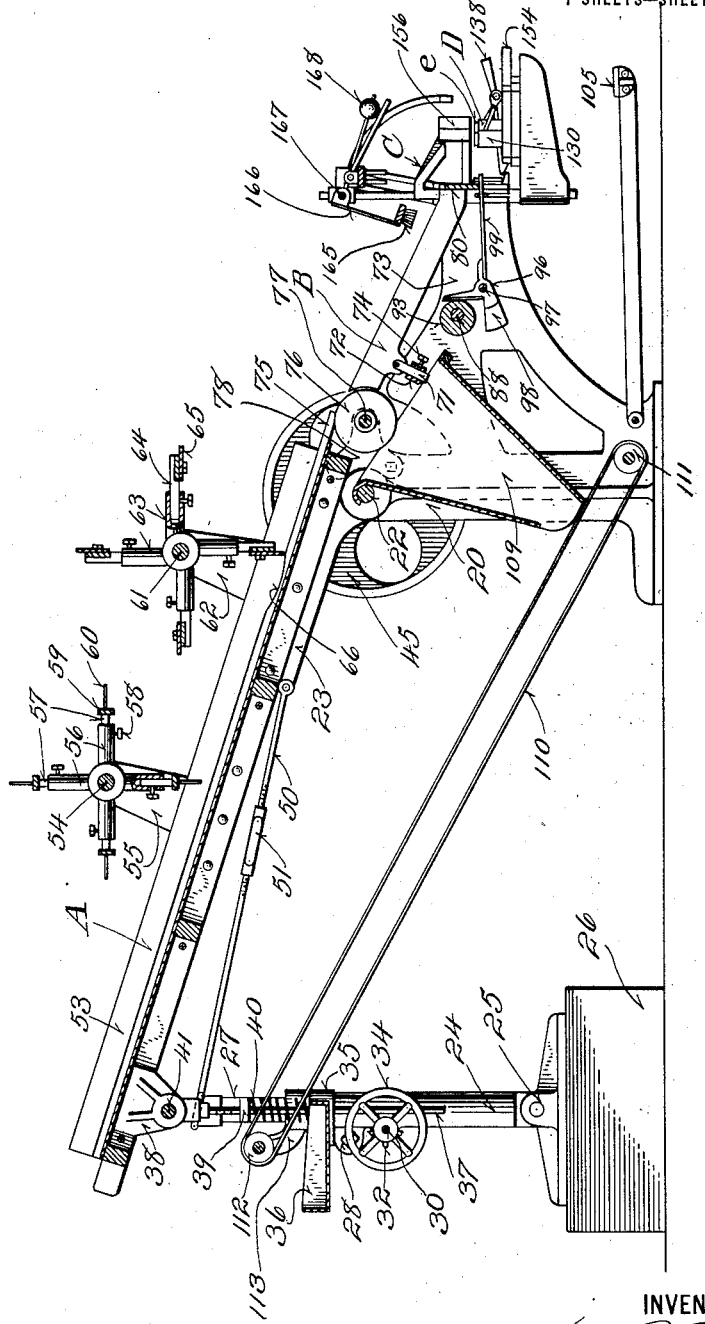

H. P. SMITH.
PACKING MACHINE FOR HAIRPINS.
APPLICATION FILED DEC. 26, 1918.
1,378,626.
Patented May 17, 1921.
7 SHEETS—SHEET 4.
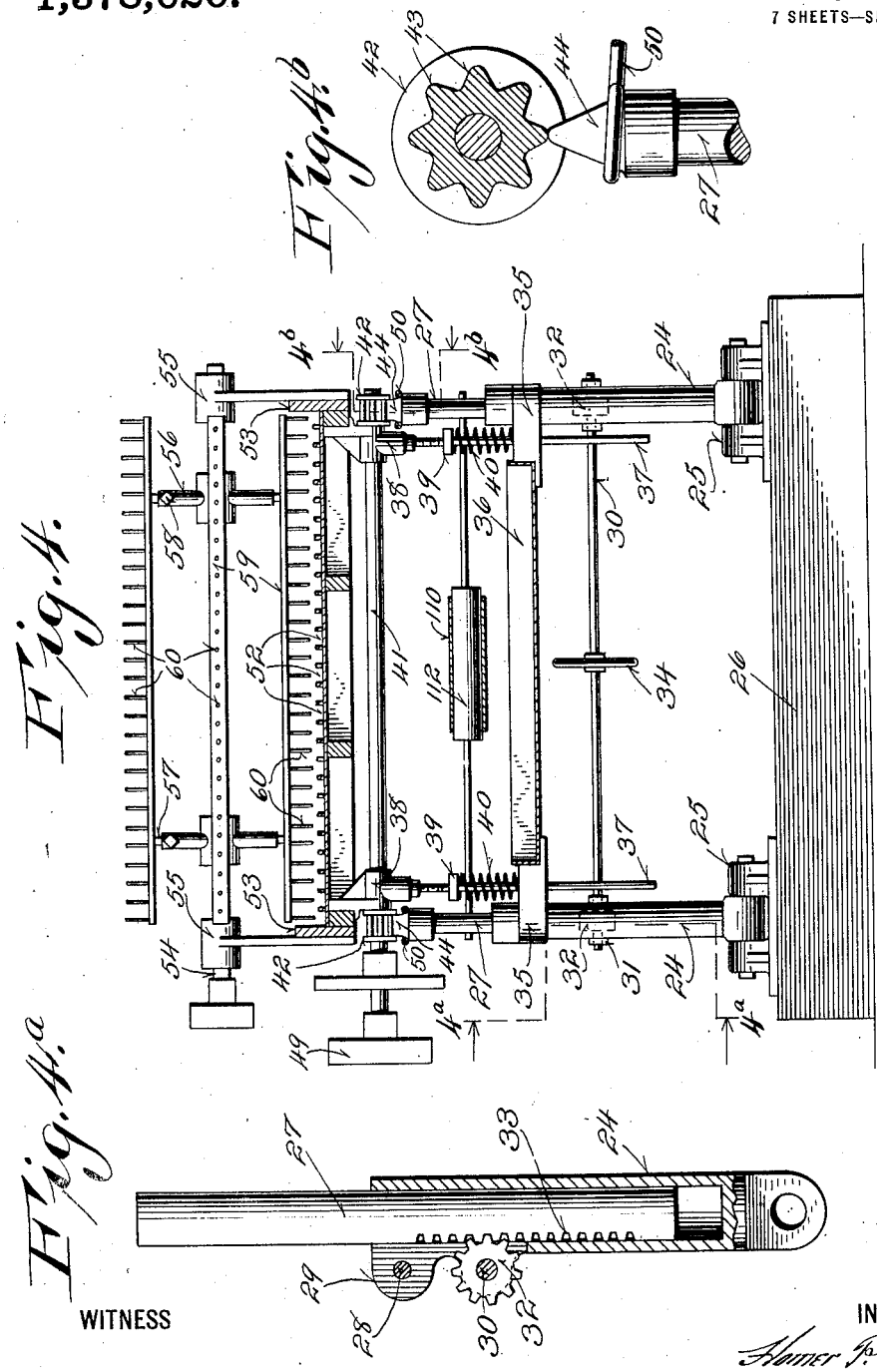
WITNESS
INVENTOR
Homer P. Smith
BY
Young & Young
ATTORNEY

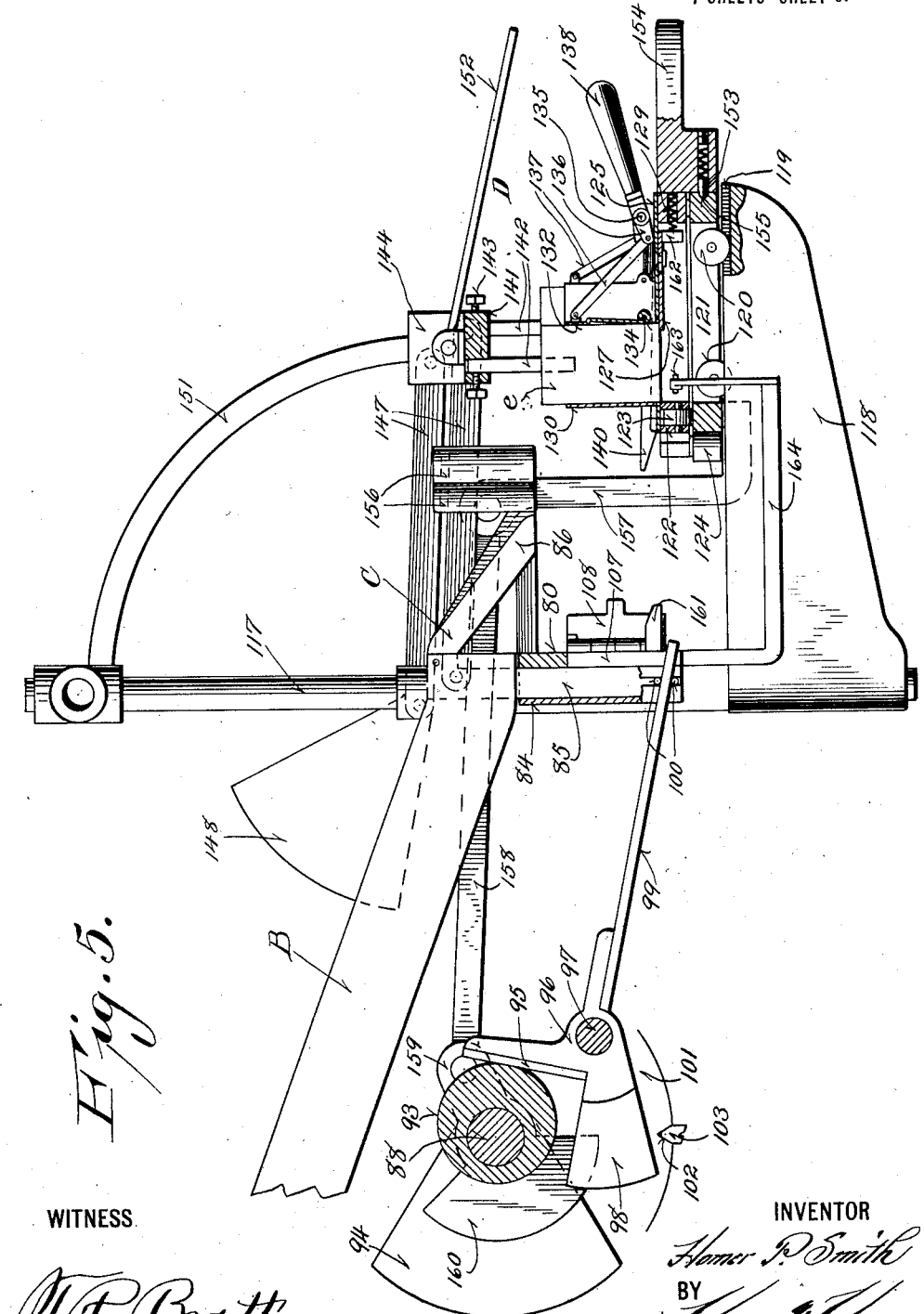

H. P. SMITH.
PACKING MACHINE FOR HAIRPINS.
APPLICATION FILED DEC. 26, 1918.
1,378,626.
Patented May 17, 1921.
7 SHEETS—SHEET 6.
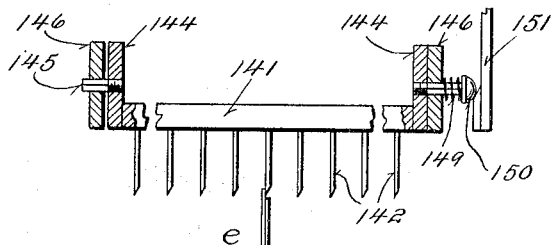
Fig. 6.
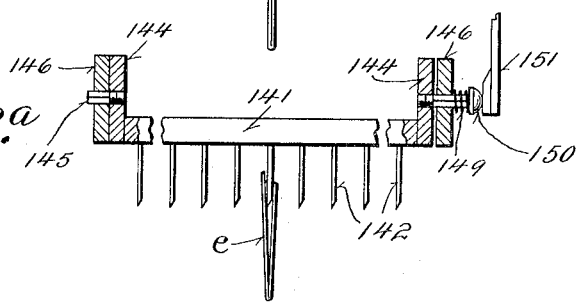
Fig. 6.ª
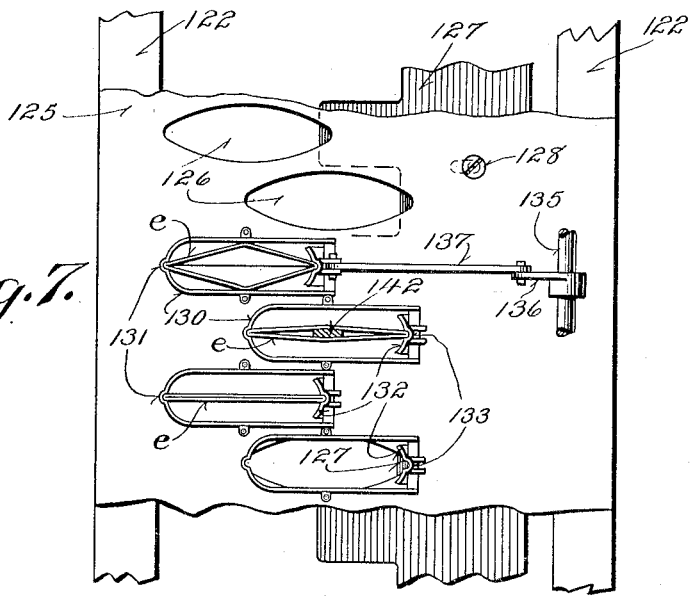
Fig. 7.
WITNESS
T. F. Britt
INVENTOR
Homer P. Smith
BY
Young & Young
ATTORNEY

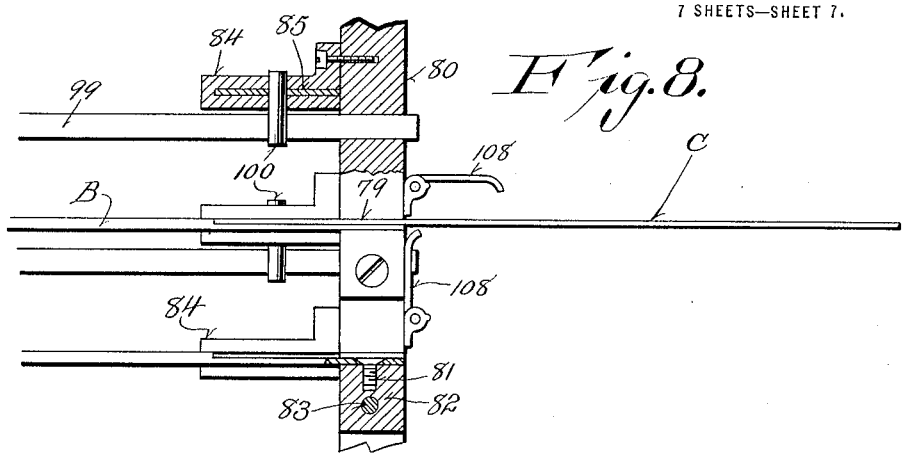
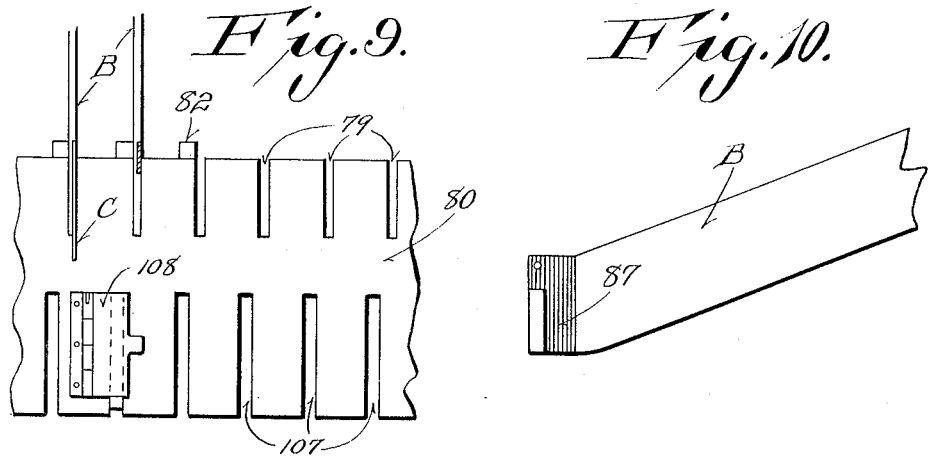

UNITED STATES PATENT OFFICE.

HOMER P. SMITH, OF APPLETON, WISCONSIN, ASSIGNOR, BY DIRECT AND MESNE ASSIGNMENTS, TO SCOLDING LOCKS HAIRPIN CO., OF APPLETON, WISCONSIN, A CORPORATION OF WISCONSIN.

PACKING-MACHINE FOR HAIRPINS.

1,378,626.   Specification of Letters Patent.   Patented May 17, 1921.

Application filed December 26, 1918. Serial No. 268,318.

*To all whom it may concern:*

Be it known that I, HOMER P. SMITH, a citizen of the United States, and resident of Appleton, in the county of Outagamie and State of Wisconsin, have invented certain new and useful Improvements in Packing-Machines for Hairpins; and I do hereby declare that the following is a full, clear, and exact description thereof.

My invention has for its primary object the provision of a machine adapted to separate hairpins into measured batches from an indiscriminate mass and to deposit such batches into containers to form the commercial packages.

Inasmuch as the hairpins, when ready for the packing operation are usually disposed in a tangled mass by reason of the final steps of manufacture, it is an important and more specific object to provide in my machine means for separating and untangling the hairpins whereby they may be measured and properly manipulated by the filling mechanism of the machine. A more detailed object in this connection resides in the provision of an arrangement whereby such hairpins as escape proper manipulation for the measuring and filling mechanism are returned to the receiving portion of the machine.

A further important object resides in the provision of an arrangement adapted to automatically procure an approximate count of the hairpins in separating them into batches for deposit in the containers.

I contemplate depositing the hairpins in commercial envelop containers, and a still further object resides in the provision of means for opening the envelops for reception of hairpins after said envelops have been placed in the machine.

A still further object resides in the provision of means for mechanically procuring discharge of envelops from the machine when they may have been filled.

A still further object resides in the provision of a machine of this character embodying a comparatively wide bank of filling mechanisms and wherein means is provided for shifting the container holding portions of the filling mechanisms with respect to the operator whereby to facilitate a most rapid manipulation on the part of the operator.

A still further object resides in the provision of an arrangement whereby the filling mechanisms may be rendered selectively and individually inoperative so as to cut out individual mechanisms from the general operation of the machine should their action become faulty.

With the above and other objects and advantages in view, which will be apparent as the description proceeds, my invention resides in the novel features of construction, combination and arrangement of parts as hereinafter more particularly described and defined by the appended claims.

In the accompanying drawings:

Fig. 3 is a vertical longitudinal sectional view through the machine on a plane indicated by the line 3—3 of Fig. 2.

Fig. 4 is a transverse sectional view through the machine on planes indicated by the broken line 4—4 of Fig. 1.

Figure 1:
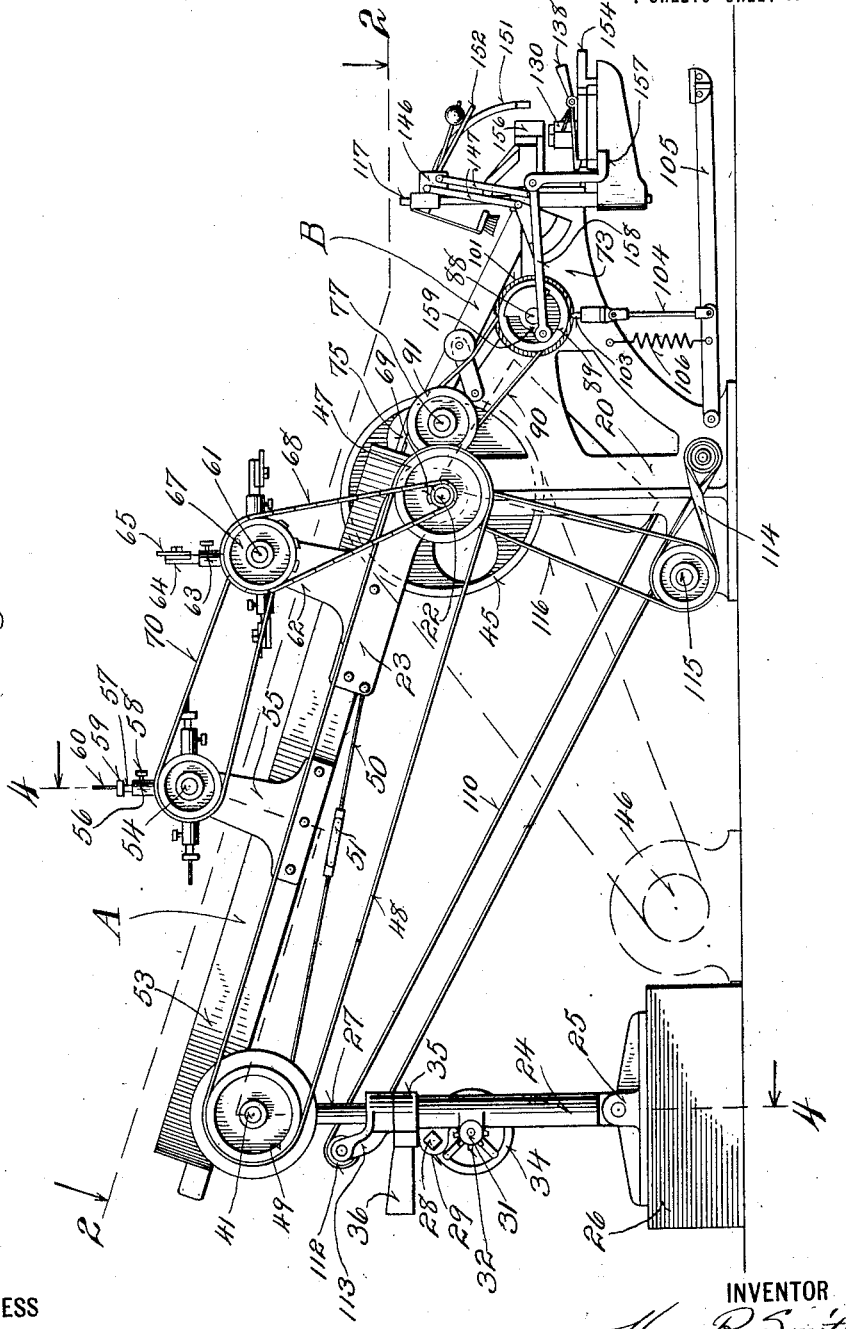
Figure 1 is a side elevational view of my hairpin separating and packing machine.
Figure 2:
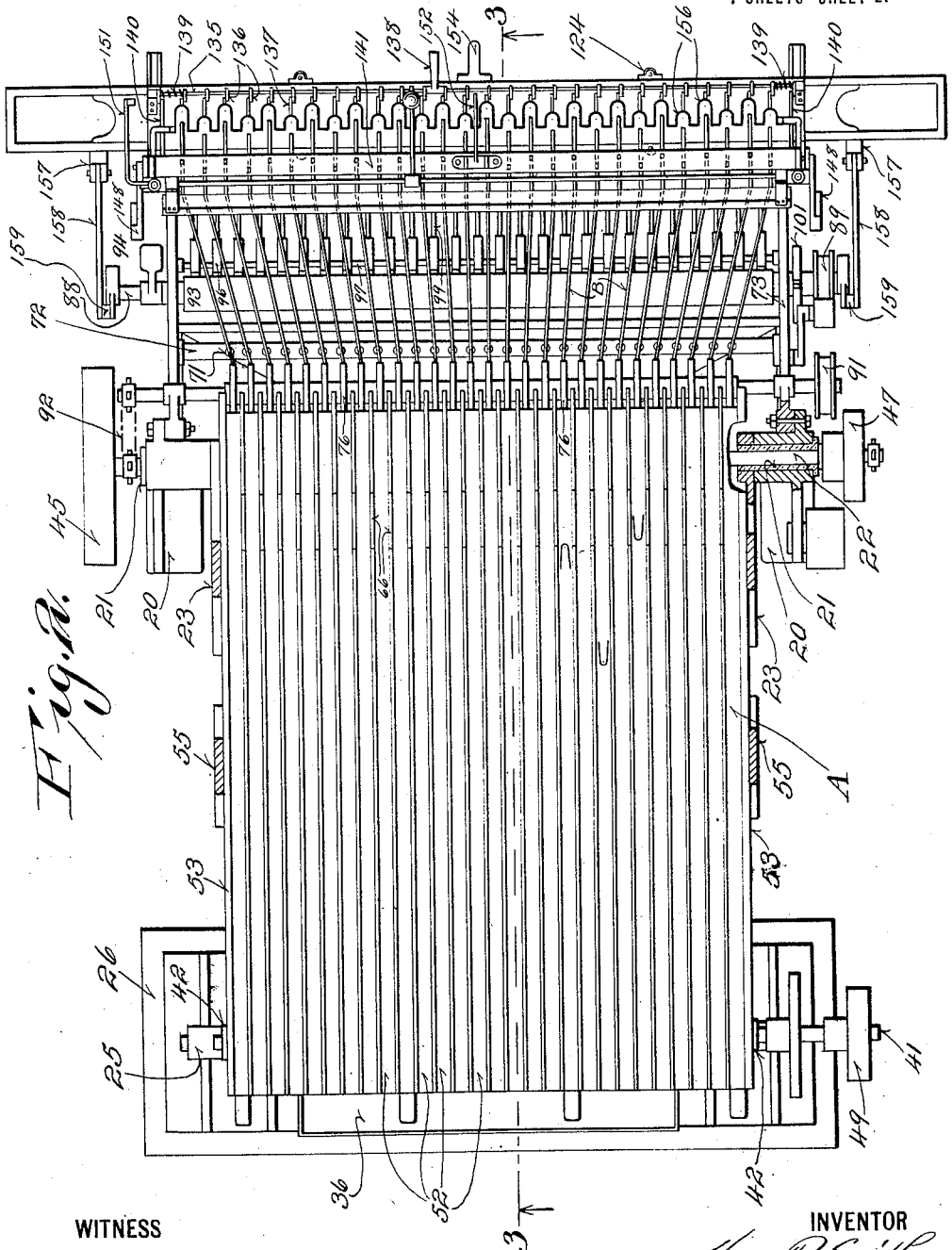
Fig. 2 is a horizontal sectional view thereof on a plane indicated by the line 2—2 of Fig. 1.

Fig. 4$^a$ is a detailed sectional view showing the means for raising and lowering the receiving end of the separating table.

Fig. 4$^b$ is a detailed sectional view showing the means for agitating the separating table.

Fig. 5 is an enlarged detailed sectional view of the measuring and filling mechanisms.

Fig. 6 is a detailed elevational view of the envelop opening mechanism the end portion thereof being in section, and the mechanism being in initial envelop engaging position.

Fig. 6$^a$ is a similar view, but showing the mechanism in laterally shifted position to institute the opening movement of the envelops.

Fig. 7 is a plan view of the envelop holding mechanism, portions thereof being broken away to more clearly disclose the structure.

Fig. 8 is a detailed view, partly in plan and partly in section, of the measuring mechanism.

Fig. 9 is a fragmentary front elevation of the head bar for the guide plates.

Fig. 10 is a detached elevational view of the forward end portion of one of the guide plates.

Fig. 11 is a detailed view showing the means for feeding the hairpins to a guide plate.

Referring now more particularly to the accompanying drawings, my machine includes a separating table A, onto which the hairpins are dumped in their tangled relation incidental to the final manufacturing steps of the hairpins, and are moved over the table and manipulated to dispose them in proper position for discharge onto a series of inclined guide plates B down which the hairpins slide to a measuring mechanism C to divide them into batches which are fed into envelops e carried by an envelop holding mechanism D including shiftably mounted tables facilitating the manual placing of envelops by the operator. Means are provided for returning to the receiving portion of the machine hairpins which are not properly fed to the guides, and for cutting out the operation of individual measuring units.

Entering now specifically into the description of a machine comprising the present embodiment of my invention, there is provided a pair of forward standards 20 having bearing heads at their upper ends to mount bearing sleeves 21 in which is journaled the main drive shaft 22 of the machine. These bearing sleeves 21 also provide a pivotal support for the forward end of the separating table A, being engaged in castings 23 secured to the forward corners of the table. The separating table is inclined upwardly toward its rear end to procure a gravity feed of hairpins deposited thereon. For adjustably supporting the rear portion of the table, and agitating the table to separate and feed hairpins thereon, a pair of tubular lower standard sections 24 have their lower ends mounted in pivot bearings 25 carried on a bed block 26 preferably having shock absorbing qualities to take up jar incidental to agitation of the table. Upper standard sections 27 are slidably mounted in the tubular sections 24, and the sections of each extensible standard thus formed are normally held against relative movement by clamp bolts 28 passed through outstanding ears 29 on the split upper end portion of the tubular sections 24. For simultaneously raising and lowering the upper sections 27, a shaft 30 is journaled in bearings 31 on the lower sections 24 and carries pinions 32 meshing with gear teeth 33 formed on the lower portions of the upper standard sections 27, the shaft being provided centrally with a suitable hand wheel 34. A collar 35 is mounted on each upper standard section 27 and seats on the corresponding lower section 24, and these collars carry inward extensions to which are secured the ends of a hairpin receiving tray 36. The extensions are also apertured for the sliding reception of rods 37 depending from castings 38 secured to the rear corner portions of the separating table. A stop member 39 is threaded on the rods 37 above the extension of the collars 35, and expansile springs 40 are disposed on the rods between said stop members and the collar extensions to thus form a resilient support for the separating table. A shaft 41 is journaled in the corner castings 38 of the table, and this shaft has secured thereon outwardly of its bearing castings a pair of wheels 42 provided with peripheral annular channels in which are disposed cam teeth 43 coacting with beveled heads 44 on the upper ends of the standard sections 27 to procure vertical oscillatory movements of the separating table upon rotation of the shaft 41, the function of the resilient support of the table being merely to lessen the shocks incidental to this oscillatory movement. It is further particularly noted that the crests of the teeth of the wheels 42 are relatively staggered whereby lifting impulses will be alternately applied to also procure a transverse oscillation of the rear portion of the table, the relative movement of the table portions to procure this transverse oscillation being procured by yielding of the relatively long framework of the table.

The main drive shaft 22 of the machine carries a pulley 45 which is driven from a conventionally shown motor 46 or other suitable source of power, and this shaft also carries a pulley 47 around which is trained a belt 48, trained also about a pulley 49 on the shaft 41. The extensible standards are braced by tie couplings 50 having turn buckles 51 disposed therein, the forward ends of the couplings being secured to the pivot castings 23 of the table, while the rear ends of the couplings are looped to embrace the heads 44 of the upper ends of the standards.

The surface of the separating table is longitudinally ribbed to define channels 52 extending throughout the length of the table. Thus, when a mass of hairpins is placed upon the upper or rear end of the table, the agitative movement of the table, which in the present instance is oscillatory in two directions, tends to jar the hairpins loose from each other so that they will lie in the channels and be fed by gravity to the lower end of the table. To exert a more positive separating action on the mass of pins, which are confined against displacement laterally from the table by upstanding guide flanges 53 thereon, a raking mechanism is mounted over the intermediate portion of the table which includes a shaft 54 journaled in standards 55 on the table and carrying radial tubular arms 56 in which bars 57 are adjustably held by set screws 58, said bars carrying rake heads 59 from which project teeth 60, the paths of rotation of the ends of the teeth lying slightly above the channel ribs, as shown particularly in Fig. 4 and the rake teeth of the bars are preferably relatively staggered. A sweep mechanism is disposed above the table forwardly of this rake mechanism and comprises a shaft 61 mounted on arms 62 upstanding from the pivot castings 23 of the table. This shaft carries spider arms 63 similar to the spider arms of the rake mechanism and in which are adjustably mounted rods 64 carrying flexible sweep members 65, the paths of movement of the outer edges of these sweep members 65 being spaced above the table a distance approximately equal to the thickness of a hairpin, and the channel ribs of the table are cut away at 66 to provide clearance for the sweep members. The sweep shaft 61 carries a sprocket wheel 67 about which is trained a sprocket chain 68 also trained about a drive sprocket 69 on the main drive shaft 22, while the rake shaft 54 is driven by a belt connection 70 with the sweep shaft. It is noted that the speed of the rake and sweep shafts is such that the speed of rotation of their respective hairpin engaging members is considerably greater than the travel of the hairpins over the table, whereby a proper separating and straightening action is assured.

The speed of travel of the hairpins over the table is controlled by the degree of slant which is imparted to the table, and the slant of the table may be adjusted by raising or lowering the upper standard sections 27 on which the table seats through the medium of the agitating wheels 42, the buffer springs 40 being afforded a compensating adjustment by moving the stops 39 on the rods 37. The separating operation effected by the table may be thus readily controlled to procure most efficient results, it being noted that the rake and sweep members may also be adjusted toward and away from the table as described. Hairpins are usually given a coating of japan, and when the hairpins in their finished form are dried, they are disposed in a closely tangled mass. This tangled mass has heretofore formed a most serious problem in economically preparing the hairpins for the market, it having been heretofore necessary for operators to individually extract hairpins from the mass and place them in their envelops or other commercial containers.

My machine entirely obviates the necessity of manually separating the hairpins, and the tangled mass is deposited on the upper end of the table. Due to the agitative movement of the table, the mass is fed forwardly and loosened and is engaged by the rake mechanism, which works the hairpins loose from the mass, throwing the tangled hairpins back for subsequent engagement, and permitting the passage of separated and partly straightened hairpins forwardly of the rake mechanism. The channel formation of the table further tends to move the hairpins so that they lie longitudinally of their path of movement, and adjacent the lower forward end of the table, the hairpins are engaged by the sweep mechanism which sweeps back those hairpins which have been untangled from the mass, but which do not lie within the channels. From the sweep mechanism the hairpins move in the channels to the forward extremity of the table and are thus maintained in proper position for deposit onto the inclined guide plates B which serve to convey the hairpins to the measuring and filling mechanisms and also afford magazines of hairpins to insure accurate operation of the measuring mechanisms. These guide plates correspond in number to the channels 52 of the table and are elongated and arranged vertically on edge. The rear ends of these plates are adjustably supported by pivotal connection with rods 71 which are transversely slidable in a bar 72 extending between and carried by arms 73 projecting forwardly from the main standards 20. The rods 71 are adjustably held in the bar by set screws 74 whereby the guide plates B may be individually adjusted. The rib portions of the table are projected past the forward end of the table at 75 and a series of conveyer wheels 76 are provided, each disposed in an approximate plane of one of the guide plates B and having its upper peripheral portion disposed between the projected ends of a pair of channel ribs. These wheels are fixed on a shaft 77 journaled in bearing brackets 78 pivoted on the standards 20, this pivotal mounting of the brackets permitting adjustment of the wheels with respect to the end of the table. The upper edges of the guide plates B are tangential to the wheels and the ends of the bars adjacent the wheels are arcuate to conform to the peripheries of the wheels whereby the hairpin receiving portions of the plates may practically coincide with the periphery of the wheels. Thus, as the hairpins move from the forward end of the table, with their bight portions either foremost, or rearmost, the legs of the hairpins will straddle the wheels 76 and will be imparted a positive conveying movement by said wheels to dispose the hairpins in straddled position on the plates B, the incline of the plates B being such that the pins will freely slide forwardly and downwardly thereon.

Taking up now the measuring means of my machine which separates the hairpins into batches for filling the commercial containers, it is noted that the forward extremities of the plates B are directed horizontally and are engaged in vertical slots 79 formed in the upper portion of a bar 80 extended transversely of the machine and secured to the forward ends of the standard arms 73. The guide plates B are pivotally secured to this bar by screws 81 passed through the plates and threaded in blocks 82 which are in turn secured on the upper edge of the bar 80 by screws 83. The bar 80 thus forms a head bar for the guide plates. A vertical channel block 84 is secured to the head bar 80 below each guide plate B, and this channel block slidably mounts the depending vertical leg 85 of a measuring member comprising a flat plate of which said leg forms a part, said plate being extended forwardly of the leg and then inclined downwardly and forwardly to form a guideway 86 for measured batches of pins. The width of the measuring plate is substantially equal to half the major width of the main guide plate B, and as shown particularly in Fig. 10 the forward end portion of the plate B is provided with an angular recess 87 extending inwardly and then downwardly from its upper forward portion. Thus hairpins moving forwardly on the guide plates B move over the measuring member which is lapped with the forward end of the guide plate, the foremost of the series of hairpins of the guide plate abutting the head bar 80. Hence, upon lifting the measuring members, the hairpins disposed thereon will be lifted and thus separated into batches, the number of hairpins in each batch being obviously determined by the length of the upper edge of the measuring member rearwardly of the head plate 80, and the number of hairpins thus defined in each batch is sufficient to fill a commercial container.

For moving the measuring members, a shaft 88 is journaled in the forward standard arms 73 and this shaft carries a pulley 89 which is driven by a belt 90 from a pulley 91 on the feed shaft 77 which in turn is driven by a sprocket connection 92 with the main drive shaft 22. A cam roller 93 is mounted on the shaft 88, being counterbalanced by a weight 94 secured on one end of the shaft, and this roller is engaged by wear plates 95 mounted on upstanding arms of a series of rock members 96 pivotally mounted on a transverse shaft 97 and having weight arms 98 holding said members in engagement with the cam roller. These rock members correspond in number to the guide plates B and measuring members and rods 99 extend forwardly from the rock members and are engaged between pairs of pins 100 on the legs 85 of the measuring members, said pins sliding in slots formed in the channel blocks 84 which mount the legs. Thus each rotation of the shaft 88 will procure a vertical reciprocation of the measuring members. To render the movement of said members intermittent and dependent upon the will of the operator, a wheel 101 is mounted on one end portion of the shaft 88 and this wheel is provided at diametrically opposed portions with recesses in which is engageable a spring pawl 103 connected by a link 104 with a forwardly extending foot treadle 105, the pawl being resiliently urged against the periphery of the wheel by a spring 106 secured to the treadle and to the adjacent standard arm 73. When the pawl is engaged in one of the recesses, the belt 90 which drives the shaft 88 slips on the pulley of the shaft and thus the measuring mechanism is normally inactive.

Should the operation of one of the measuring mechanisms become faulty, or should the hairpins fail to engage properly on the corresponding guide plate B, the individual measuring mechanism may be rendered inoperative, and this individual control of the operation of the measuring mechanism is afforded by extending the actuating rods 99 of the measuring members through vertical slots 107 in the lower portion of the head bar 80 and providing hinge plates 108 on said bar between the slots, and each adapted to swing across a corresponding slot and hold the rod in lowered position against the action of the weight arm 98 of the corresponding rocking member. Also, means is provided for returning to the rear portion of the machine, hairpins which pass over the table but do not properly engage on the guide plates B. This means comprises a hopper or apron 109 having an enlarged mouth portion disposed under the discharge end of the table and the receiving ends of the guide plates B. This apron discharges on an endless belt 110 extending longitudinally under the table and mounted on a roller carried by a shaft 111 journaled in the lower portions of the standards 20 and on a roller carried by a shaft 112 disposed over the tray 36 and journaled in bracket arms 113 mounted on the rear standards. The shaft 111 of this return conveyer belt is driven by a crossed belt connection 114 with a stub shaft 115 journaled on the base of one of the standards 20, said shaft 115 being in turn driven by a belt connection 116 with the main drive shaft 22. Thus, hairpins which do not properly engage and slide on the guide plates B will be conveyed rearwardly and deposited in the tray 36 and upon accumulation in the tray will be removed by the operator and placed on the separating table.

Entering now into a description of the filling mechanism, a pair of vertical bars 117 have their intermediate portions secured to the forward ends of the standard arms 73. Forwardly extending track blocks 118 are carried by the lower ends of the bars 117 and are provided with longitudinal channels 119 in their upper portions in which ride rollers 120 carried by a lower table 121 whereby the table may be shifted forwardly and rearwardly, the intermediate portion of the table being open to permit the passage of filled envelops therethrough. A transversely shiftable upper table is mounted on the lower table 121, having frame bars 122 which carry rollers 123 riding on the upper surfaces of the lower table and rollers 124 riding against the side edges of the lower table. A plate 125 is mounted on the frame bars 122 and is provided with a longitudinal staggered series of openings 126 adapted to permit the passage therethrough of a filled envelop, the length of the openings being slightly greater than the lengths of the envelops, and to prevent passage of the envelops through the openings prior to filling the same, a plate 127 is slidably mounted for transverse movement under the plate 125 by pin and slot connections 128 therewith, this plate being normally urged rearwardly by a spring 129 so that portions thereof project across the forward ends of the openings 126 to provide supporting ledges for envelops mounted over said openings. The envelops are supported over the openings by U-shaped plates 130 upstanding on and having side edges secured to the plate 125 about the openings 126, the bight portions of said plates being disposed rearwardly and provided with vertical channels 131 for receiving the rear edge portion of envelops. Spreader plates 132 are disposed between the forward edges of the U-shaped plates 130, being provided with similar channels 133 for receiving forward edges of the envelops, and being pivoted at their lower ends preferably as at 134 to the forward edge portions of the plate 130 whereby said spreader members may move inwardly to open the envelops for the reception of hairpins. To procure this opening movement of the spreader members, a shaft 135 is journaled on the forward portion of the upper table and carries crank arms 136 connected by links 137 with the upper portions of the spreader plates 132, the shaft being provided centrally with an operating handle 138 and being resiliently urged to a position retracting the spreader plates by springs 139 coiled on its end portions. For holding the plates 132 in spreading position, an elongated pawl 140 is secured at one end to one of the crank arms 136 of the actuating shaft and extends rearwardly across the table with its rear end hooked to engage the rear edge of the table, the rear end of the pawl being further beveled to procure its automatic release as will be later described. Prior to operation of the spreader blades 133, it is desirable to partially spread the sides of the envelop to prevent both sides from collapsing in the same direction. To effect this initial spreading or opening movement, a bar 141 is provided having depending opener blades 142 adjustably secured therein by set screws 143, said bar being provided with upstanding arms 144 having squared pins 145 extending outwardly therefrom and slidably engaged in end plates 146 which are mounted to swing above the table in its outward position by pivotal connection with pairs of links 147 pivoted to the intermediate portions of the bars 117, one of said links being provided with a counter-balance weight 148 whereby the mechanism described is normally held in raised position, it being noted that by reason of the double link connection with the end plates, said plates and the bar maintain a horizontal position in swinging movement. As shown particularly in Figs. 6 and 6ª, the envelops e which I employ have one wall extended above the other and I utilize this wall extension to insure engagement of the opener blades 142 in the envelops by providing for a transverse shifting movement of the blades as they move below the upper edge of this wall extension. The blade carrying bar 141 is normally held at one limit of its shifting movement by a spring 149 coiled on the extended end of one of the squared pins 145 between the adjacent end plate 146 and the headed extremity 150 of the pin, and in this position of the blade carrying bar, as shown in Fig. 6, the blades are disposed slightly to one side of the envelops when held in proper position on the table. For shifting the blade holding bar to engage its blades with the wall extensions of the envelops, an arm 151 extends forwardly and downwardly from one of the bars 117 and has a cam portion on its lower end engageable with the pin head 150 to shift said pin and the blade carrying bar transversely of the machine against the action of the spring 149. As shown in Fig. 6ª this shifting movement is timed to occur as the pins pass the horizontal plane of the upper edges of the envelop wall extensions, to thus spread the wall extensions laterally whereby the blades are insured ready entrance into the envelops to effect a partial opening thereof, the lower ends of the blades being preferably beveled. A handle 152 projects forwardly from the blade carrying bar 141 and thus, to spread envelops mounted in the holders on the upper table, this handle is grasped and swung downwardly to engage the blades 142 in the envelops, partially opening said envelops, and the handle 138 is then grasped and swung downwardly to complete the opening or spreading movement, the envelops being held in said spreading movement by the engagement of the pawl 140 with the rear edge of the table.

The aforedescribed operation of the blades 142 can obviously only occur when the upper table is centered on the lower table 121, and to procure accurately this centering position, and yieldably hold the upper table in centered position, a spring urged plunger 153 is slidably mounted in the lower portion of a handle 154 projecting forwardly from the upper table, and the end of this plunger is rounded for engagement in a rounded recess 155 in the central portion of the forward edge of the lower table 121. The upper table, with its slidable mounting is provided for the purpose of procuring a most ready access of the operator to the envelop holding members for placing the envelops therein, it being desirable to make the machine of relatively great width and the operator may thus slide the upper table transversely in charging the same with envelops, so that all of the envelop holding members may be brought within easy reach, and the shiftable mounting of the lower table is also for the purpose of facilitating the placing of envelops, the tables in their rearward limits of movement being so disposed that the envelops are directly under the forward ends of the downwardly inclined conveyer portions 86 of the measuring members, arcuate hoods 156 being disposed forwardly of the discharge ends of the portions 86 and just above the planes of the tops of the envelops to insure discharge of the pins into the envelops. At the forward limits of movement of the tables, the envelop holding members are clear of said hoods.

The forward and rearward shifting movements of the tables are procured mechanically in synchronism with operation of the measuring mechanisms. Thus, upstanding arms 157 are carried by the rear corner portions of the lower table 121, said arms providing clearance for the upper table to move therepast, and these arms are connected by pitman links 158 with crank arms 159 on the ends of the shaft 88, said crank arms being counterbalanced at 160. Thus, a complete reciprocation is imparted to the tables upon each reciprocation of the measuring mechanisms, and as the measuring members move upwardly, separating measured batches of hairpins from the series of pins on the plates B, the tables move inwardly to dispose the envelops carried thereon under the discharge ends of the slide portions 86, and it is noted that as the measuring members move upwardly and are halted by the engagement of the plunger 103 in the corresponding recess 102 of the stop wheel 101, the tables are halted at a position adjacent their inward limit of movement. Thus upon again starting rotation of the shaft 88 by withdrawing the pawl 103, the tables will be imparted a slight inward movement by the completion of the crank throw, before the tables start on their outward movement to expose the envelop holding members to the operator. This slight inward shifting movement is utilized to release the envelops from the tables, whereby the envelops drop through the tables and are thus discharged from the machine. To effect this release of the envelops, a cam block 161 projects forwardly from the lower portion of the head plate 20 and engages the pawl 140 which holds the envelops in spread position, lifting said pawl to release its engagement with the rear edge of the upper table, and permitting the spreader plates 132 to swing outwardly under influence of the springs 139 on the shaft 135, with which said plates are in link connection. As this releasing movement of the pawl takes place, the envelop seating plate 127 is shifted rearwardly by engagement of a depending pawl 162 on said plate with an abutment pin 163 carried by an angular bracket 164 projecting downwardly from the head plate 80 and then extended forwardly and upwardly within the openings of the tables, said bracket being located centrally of the machine whereby to permit free transverse movement of the upper table, which in no event would be moved past the center.

When the tables are shifted inwardly, and the measuring members raised, the machine being automatically halted in this position, the batches of pins carried on the measuring members are swept from their horizontal portions onto the inclined portions 86, whence they are discharged by gravity to the envelops, by a brush member 165 extending transversely across the machine and carried on arms 166 depending from a shaft 167 carried by the upper ends of the bar 117, a weighted handle 168 being secured to this shaft and normally holding the brush rearwardly of the measuring members.

Reviewing now the operation of the entire machine, a promiscuous tangled mass of hairpins is placed on the upper end of the separating table A, and by the agitative movements of the table together with the action of the rake and sweep mechanisms disposed thereover, the hairpins are separated and arranged to lie in the channels 52 of the table, moving downwardly in said channels past the sweeping mechanism and straddling the wheels 76 by which the hairpins are transferred to the inclined guide plates B. The hairpins slide down these guide plates by gravity and are collected on the plates, forming magazines of supply for the measuring members. When a sufficient number of hairpins has been collected on the guide plates B upon initially starting the machine, it being assumed that the measuring members are lowered and the tables disposed outwardly, the operator depresses the treadle 105, thus starting rotation of the shaft 88 which procures an inward movement of the tables and a raising movement of the measuring members. Rotation of the shaft 88 is then stopped by engagement of the treadle pawl 103 in the other recess 102. The operator then swings the handle 168 upwardly, sweeping the brush 165 forwardly to clear the batches of hairpins from the measuring members and discharge said batches into the envelops. The operator then again depresses the treadle 105 which procures another half rotation of the shaft 88, lowering the measuring members to receive fresh charges of hairpins from the guide plates B, and shifting the tables upwardly whereby they may again be filled with envelops. It being noted that prior to the outward shifting movement, a slight inward shifting movement occurs to release the filled envelops from the table as heretofore explained. With the table shifted outwardly the operator then fills the envelop holding members, shifting the upper table transversely to bring all of said members within easy reach. The operation is then repeated, it being noted that the movement of the separating table and rake and sweep mechanisms is continuous to procure an adequate supply of hairpins to the guide plates.

While I have shown and described a preferred embodiment of my invention, it will be appreciated that various changes and modifications of structure may be employed to meet differing conditions of use and manufacture, and while I have described my machine as adapted for use in packing hairpins, it will be appreciated that certain features of the invention may be adapted for packing various other articles not necessarily of similar shape or nature, without departing in any manner from the spirit of my invention.

What is claimed is:

1. A machine for packing hairpins and like articles including a table provided with longitudinal channels, means for separating articles on the table and causing said article to travel in the channels, a series of guides extending in mutual divergence from one end of the table and arranged to receive articles from the channels of the table, means for supporting a series of containers adjacent the ends of the guides and means for feeding articles from the guides into said containers.

2. A machine for packing articles comprising a series of guides, continuously operative means for feeding articles to said guides to form magazines of supply, a table movable toward and away from the guides, means for supporting a series of containers on the table, means for moving the table toward and away from the guides, manually releasable means for interrupting said movement and means for feeding articles from the guides into containers on the table.

3. A machine for packing articles including a table provided with a multiplicity of longitudinally extending channels, means for separating articles on the table and causing said articles to move in the channels, guides extending from the ends of the channels, means for supporting a multiplicity of containers and means for feeding articles simultaneously from said guides into the containers.

4. A machine for packing articles including a series of guides, a table shiftable to and from a position adjacent the discharge ends of the guides, means for feeding articles to said guides, a series of members on said table adapted to receive containers for holding said containers in upright position and means for feeding articles from said guides into said containers.

5. A machine for packing hairpins and like articles including continuously operative means for separating said articles from a mass, guides extending from said means and adapted to collect articles thereon, a shiftable container holding table, means for removing articles from said guides in measured batches, means for simultaneously actuating said article removing means and shifting the table, and means for feeding said measured batches into containers on the table.

6. A machine for packing hairpins and like articles including continuously operative means for separating said articles from a mass, guides extending from said means and adapted to collect articles thereon, a shiftable container holding table, means for removing articles from said guides in measured batches, means for simultaneously actuating said article removing means and shifting the table, means for feeding said measured batches into containers on the table, and means by movement of the table for releasing containers from said holding table.

7. A machine for packing hairpins and like articles including continuously operative means for separating said articles from a mass, guides extending from said means and adapted to collect articles thereon, a shiftable container holding table, means for removing articles from said guides in measured batches, means for simultaneously actuating said article removing means and shifting the table, means for feeding said measured batches into containers on the table, said container holding table being apertured to permit the passage of envelops therethrough, and means for releasing envelops held by the table to permit passage therethrough.

8. In a machine of the class described, a table provided with longitudinal channels, means for moving said table to procure the feeding of the articles on the table toward one end, stationary guides located in spaced relation to the last mentioned end on the table, one of said guides being provided for each of said channels, and an individual rotary connecting member bridging the space between each coöperating channel and guide.

9. In a machine of the class described, a table provided with longitudinal channels, means for separating articles placed on the table and for procuring feeding movement of said articles in the channels to one end of the table, and guides extending from said end of the table between the sides of the channels to receive articles therefrom.

10. A machine of the class described, a table provided with longitudinal channels, means for separating articles placed on the table and for procuring feeding movement of said articles in the channels to one end of the table, wheels mounted at the discharge end of the table, means for driving said wheels, and guide plates extending from the peripheries of the wheels and adjustable with respect thereto.

11. In a machine of the class described, a support, a table pivoted at one end to the support and provided with longitudinal channels and inclined upwardly from the support, means engageable with the other end portion of the table for agitating said table, separating means mounted over the table, and guides extending from the lower portion of the table to receive articles from the channels.

12. In a machine of the class described, a support, a table pivoted at one end to the support and provided with longitudinal channels and inclined upwardly from the support, means alternately engageable with upper corner portions of the table for imparting agitative impulses thereto, separating means mounted over the table, and guides extending from the lower portion of the table to receive articles from the channels.

13. In a machine of the class described, a support, a table pivoted at one end to the support and inclined upwardly from said support, means on the table for separating articles, guides extending from the lower portions of the table to receive separated articles, and means for imparting alternate oscillatory impulses to the upper corner portions of the table.

14. In a machine of the class described, a support, a table pivoted at one end to the support and inclined upwardly from said support, means on the table for separating articles, guides extending from the lower portions of the table to receive separated articles, wheels carried by the upper corner portions of the table and provided with peripheral cam projections, means for rotating said wheels, and standards having heads on which the cam portions of the wheels engage.

15. In a machine of the class described, a support, a table pivoted at one end to the support and inclined upwardly from said support, means on the table for separating articles, guides extending from the lower portions of the table to receive separated articles, wheels carried by the upper corner portions of the table and provided with peripheral cam projections, means for rotating said wheels, standards having heads on which the cam portions of the wheels engage, and couplings connecting said standards and the forward portions of the frame.

16. In a machine of the class described, a support, a table pivoted at one end to the support and inclined upwardly from said support, means on the table for separating articles, guides extending from the lower portion of the table to receive separated articles, wheels carried by the upper corner portions of the table and provided with peripheral cam projections, means for rotating said wheels, and vertically extensible standards having heads on which the cam portions of the wheels engage.

17. In a machine of the class described, a support, a table pivoted at one end to the support and inclined upwardly from said support, means on the table for separating articles, guides extending from the lower portion of the table to receive separated articles, wheels carried by the upper corner portions of the table and provided with peripheral cam projections, means for rotating said wheels, pivoted extensible standards having heads on which the cam portions of the wheels engage, and couplings connecting said standards and forward portions of the frame.

18. In a machine of the class described, an inclined table provided with longitudinal channels, guides extending from the lower portion of the table to receive articles from the channels, means for agitating the tables, a rotary rake mechanism mounted over the table to engage articles thereon, and means for rotating said mechanism in a direction opposite to the direction of movement of articles on the table.

19. In a machine of the class described, an inclined table provided with longitudinal channels, guides extending from the lower portions of the table to receive articles from the channels, means for agitating the tables, a rotary rake mechanism mounted over the table, a rotary sweep mechanism mounted over the table between the rake mechanism and the lower end of the table, and means for rotating said mechanisms in a direction opposite to the direction of movement of articles on the table.

20. A machine of the class described including a table provided with longitudinal channels, means for separating articles placed on the table and procuring feeding of articles in the channels to one end of the table, guides extending from said end of the table to receive articles from the channels, and means for returning to the other end of the table articles which are not received on said guides.

21. A machine of the class described including a table provided with longitudinal channels, means for separating articles placed on the table and procuring feeding of articles in the channel to one end of the table, guides extending from said end of the table to receive articles from the channels, a conveyer belt extending longitudinally under the table, and a hopper disposed under the discharge end portion of the table and arranged to discharge on the conveyer.

22. In a machine of the class described, a series of guides, means for feeding articles to said guides, a measuring mechanism associated with each of said guides for removing articles from the guide in measured batches, and means for selectively rendering said mechanisms inoperative.

23. In a machine of the class described, a series of inclined guides, means for feeding articles onto the upper end portions of the guides, said articles straddling the guides, measuring members each having a portion in lapped engagement with the lower end portion of one of the guides, and means for shifting said measuring members upwardly to raise predetermined numbers of said articles from the guides.

24. In a machine of the class described, a series of inclined guides, means for feeding articles onto the upper end portions of the guides, said articles straddling the guides, measuring members each having a portion in lapped engagement with the lower end portion of one of the guides, means for shifting said measuring members upwardly to raise predetermined numbers of said articles from the guides, a container holding table, and means for moving articles from said measuring members to containers on the table.

25. In a machine of the class described, a series of inclined guides, means for feeding articles onto the upper end portions of the guides, said articles straddling the guides, measuring members each having a portion in lapped engagement with the lower end portion of one of the guides, means for shifting said measuring members upwardly to raise predetermined numbers of said articles from the guides, said measuring members including inclined discharge portions, a container holding table under said discharge portions, and means for moving articles on the measuring members to said discharge portions.

26. In a machine of the class described, a series of inclined guides, means for feeding articles onto the upper end portions of the guides, said articles straddling the guides, measuring members each having a portion in coacting engagement with the lower end portion of one of the guides, means for shifting said measuring members upwardly to raise predetermined numbers of said articles from the guides, said measuring members including inclined discharge portions, a container holding table under said discharge portions, deflector hoods adjacent the discharge ends of said inclined portions of the measuring members, and means for moving articles onto said inclined portions.

27. In a machine of the class described, a series of inclined guides, means for feeding articles onto the upper end portions of the guides, said articles straddling the guides, measuring members each having a portion in coacting engagement with the lower end portion of one of the guides, means for shifting said measuring members upwardly to raise predetermined numbers of said articles from the guides, said measuring members including inclined discharge portions, a container holding table under said discharge portions, means for moving articles on the measuring members to said discharge portions, and a swinging brush mounted over said measuring members for sweeping articles therefrom.

28. A machine of the class described including a support, a plurality of discharge members, a table shiftable to and from a position under the said discharge members, and means on said table for holding containers.

29. A machine of the class described including a support, a plurality of discharge members, a table shiftable to and from a position under the said discharge members, a second table mounted on the first table and shiftable with respect thereto in a direction transverse to the direction of shifting movement of the first table, and means for holding an elongated series of containers on the first table.

30. In a machine of the class described, a series of discharge members, a table movable to and from a position under said discharge members, means for mounting containers on the table, and means operable by movement of the table for releasing the containers therefrom.

31. In a machine of the class described, a series of discharge members, a table movable to and from a position under said discharge members, means for mounting containers on the table, means on the table for compressing containers to spread them, and means operable by movement of the table for releasing said spreading means.

32. In a machine of the class described, a series of discharge members, a table movable to and from a position under said discharge members, means for mounting containers on the table, means on the table for compressing containers to spread them, and means engageable with the containers on the table prior to operation of such spreading means for procuring an initial spreading of said containers.

33. In a machine of the class described, a series of discharge members, a table movable to and from a position under said discharge members, means for mounting containers on the table, means on the table for compressing containers to spread them, and means engageable with the containers on the table prior to operation of such spreading means for procuring an initial spreading of said containers, said means including blade members movable between the walls of the containers.

34. In a machine of the class described, a series of discharge members, a table movable to and from a position under said discharge members, means for mounting containers on the table, means on the table for compressing containers to spread them, and means engageable with the containers on the table prior to operation of such spreading means for procuring an initial spreading of said containers, said means including a member swinging to and from a position over the containers, blades on said members engageable between the walls of the containers, and means for shifting said members laterally to engage against projected wall portions of the containers.

In testimony that I claim the foregoing I have hereunto set my hand at Appleton, in the county of Outagamie and State of Wisconsin.

HOMER P. SMITH.